(12) United States Patent
Kim et al.

(10) Patent No.: US 8,420,727 B2
(45) Date of Patent: Apr. 16, 2013

(54) POLYCARBONATE RESIN COMPOSITION AND PREPARATION METHOD THEREOF

(75) Inventors: Kyoung Tae Kim, Uiwang-si (KR); Chang Min Hong, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 600 days.

(21) Appl. No.: 12/672,296

(22) PCT Filed: Aug. 6, 2008

(86) PCT No.: PCT/KR2008/004556
§ 371 (c)(1),
(2), (4) Date: Feb. 5, 2010

(87) PCT Pub. No.: WO2009/020341
PCT Pub. Date: Feb. 12, 2009

(65) Prior Publication Data
US 2011/0071246 A1    Mar. 24, 2011

(30) Foreign Application Priority Data

Aug. 6, 2007  (KR) .................. 10-2007-0078453
Aug. 7, 2007  (KR) .................. 10-2007-0079012
Aug. 5, 2008  (KR) .................. 10-2008-0076236

(51) Int. Cl.
*C08K 3/40*    (2006.01)

(52) U.S. Cl.
USPC ........................................................ 524/494

(58) Field of Classification Search .................. 524/494
See application file for complete search history.

(56) References Cited

U.S. PATENT DOCUMENTS

| 6,441,068 | B1 | 8/2002 | Eckel et al. |
| 7,091,267 | B2 | 8/2006 | Venderbosch et al. |
| 8,299,150 | B2 | 10/2012 | Nagatoshi et al. |
| 2006/0094813 | A1 | 5/2006 | Warth et al. |

FOREIGN PATENT DOCUMENTS

| JP | 60-004550 | | 1/1985 |
| JP | 05-311029 | | 11/1993 |
| JP | 08-27366 | A | 1/1996 |
| JP | 08-27368 | A | 1/1996 |
| JP | 08027368 | * | 1/1996 |
| JP | 2000-239437 | | 9/2000 |
| JP | 2002-179900 | | 6/2002 |
| JP | 2003-105184 | | 4/2003 |
| JP | 18-188569 | A | 7/2006 |
| JP | 2006-176569 | | 7/2006 |
| WO | 99/07778 | A1 | 2/1999 |
| WO | 03/080729 | A1 | 10/2003 |
| WO | WO 03080729 | A1 * | 10/2003 |
| WO | 2006/040087 | A1 | 4/2006 |
| WO | 2009/020341 | A2 | 2/2009 |

OTHER PUBLICATIONS

English Translation of JP08-027368. Sep. 6, 2012. Obtained at http://www4.ipdl.inpit.go.jp/Tokujitu/PAJdetail.ipdl?N0000=60&N0120=01&N2001=2&N3001=H08-027368.*
International Search Report in counterpart International Application No. PCT/KR2008/004556, dated Jan. 29, 2009.

* cited by examiner

*Primary Examiner* — Ling Choi
*Assistant Examiner* — Lanee Reuther
(74) *Attorney, Agent, or Firm* — Summa, Additon & Ashe, P.A.

(57) ABSTRACT

A polycarbonate resin composition with excellent rigidity (flexural strength) and impact resistance, and a method of preparing the same are disclosed. The polycarbonate resin composition includes 1 to 70 parts by weight of a filament filler of 5~30 mm based on 100 parts by weight of the total amount of a first polycarbonate resin (A) having a weight-average molecular weight of 25,000 g/mol or less, the filament filler (B), and one of a second polycarbonate resin (C) having a weight-average molecular weight of more than 25,000 g/mol and a rubber-modified styrene graft copolymer resin and a styrene copolymer resin (C'). The polycarbonate resin composition provides high rigidity and impact strength, and thus is useful to manufacture a variety of molded articles such as mobile products, electronic components, etc.

9 Claims, No Drawings

POLYCARBONATE RESIN COMPOSITION AND PREPARATION METHOD THEREOF

CROSS-REFERENCE TO RELATED APPLICATIONS

This application is a national stage application under 35 USC Section 371 and claims priority to and the benefit of International Application No. PCT/KR2008/004556, filed Aug. 6, 2008, designating the U.S. and published as WO 2009/020341, and further claims priority to and the benefit of Korean Patent Application No. 10-2007-0078453 filed in the Korean Intellectual Property Office on Aug. 6, 2007, Korean Patent Application No. 10-2007-0079012 filed in the Korean Intellectual Property Office on Aug. 7, 2007, and Korean Patent Application No. 10-2008-0076236 filed in the Korean Intellectual Property Office on Aug. 5, 2008, wherein the entire disclosure of each of the foregoing is incorporated herein by reference.

FIELD OF THE INVENTION

The present invention relates to a method of preparing a polycarbonate resin composition having excellent rigidity (flexural strength) and impact resistance, and more particularly, to a method of preparing a polycarbonate resin composition that has superior rigidity and impact resistance via reinforcement with filament.

BACKGROUND OF THE INVENTION

Polycarbonate resins have been widely used as engineering plastics due to their excellent impact resistance, self-extinguishing property, dimensional stability, and high thermal resistance as compared to other resins. However, the polycarbonate resin has a very low rigidity (flexural strength) due to its amorphous structure so that it has been limited in application to thin-film injection products.

Such a problem can be overcome by mixing filler materials such as glass fiber with the polycarbonate resin, and introduction of the reinforcing fiber into a polymerized resin product can improve tensile strength, creep and fatigue resistance, and thermal-expansion resistance, as well as rigidity. However, it also causes a serious deterioration in impact resistance of a polycarbonate resin composition.

One solution to this problem is to employ a milled glass fiber in a large or small amount. However, this approach can provide a slight improvement in impact strength with a predetermined content of the glass fiber, but involves a decrease in effect of improving the rigidity.

Another approach is reinforcement of the resin with filament fillers instead of introduction of staple fillers into the resin. However, effective filling of the filament fillers is very difficult due to a high viscosity of the polycarbonate composition which is an amorphous resin.

As a result of extensive studies to solve the above problems, the inventors of the present invention found that a resin composition exhibiting excellent impact resistance while maintaining high rigidity could be prepared by adding a filament filler to a high-fluidity polycarbonate resin having a weight-average molecular weight of 25,000 g/mol or less to form a master-batch, and blending the master-batch with a high-molecular weight polycarbonate resin having a weight-average molecular weight of more than 25,000 g/mol or with a master-batch of a rubber-modified styrene graft copolymer resin and a styrene copolymer resin.

SUMMARY OF THE INVENTION

An aspect of the present invention is to provide a method of preparing a polycarbonate resin composition capable of improving rigidity without causing deterioration of impact resistance.

It is noted that the present invention is not limited to the aforementioned aspect, and other aspects of the present invention could be readily understood by a skilled person in the art with reference to the following description.

In accordance with an aspect of the present invention, a polycarbonate resin composition includes 1~70 parts by weight of a filament filler having a length of 5~30 mm based on 100 parts by weight of the total amount of a first polycarbonate resin having a weight-average molecular weight of 25,000 g/mol or less, the filament filler, and one of the following resins (1) and (2):

(1) a second polycarbonate resin having a weight-average molecular weight of more than 25,000 g/mol; and (2) a rubber-modified styrene graft copolymer resin and a styrene copolymer resin.

In accordance with another aspect of the present invention, a method of preparing a polycarbonate resin composition includes: i) forming a master-batch by adding a filament filler to a first polycarbonate resin having a weight-average molecular weight of 25,000 g/mol or less; and ii) blending the master-batch with a second polycarbonate resin having a weight-average molecular weight of more than 25,000 g/mol.

In accordance with a further aspect of the present invention, a method of preparing a polycarbonate resin composition includes: i) forming a first master-batch by adding a filament filler to a polycarbonate resin having a weight-average molecular weight of 25,000 g/mol or less; ii) forming a second master-batch, the second master-batch comprising a rubber-modified styrene graft copolymer resin and a styrene copolymer resin; and iii) blending the first master-batch and the second master-batch.

In accordance with yet another aspect of the present invention, a plastic molded article formed of the polycarbonate resin composition is provided.

In accordance with yet another aspect of the present invention, a polycarbonate resin composition including a first polycarbonate resin having a weight-average molecular weight of 25,000 g/mol or less, a filament filler, and one of the following resins (1) and (2), the polycarbonate resin having a morphology formed by blending one of the following resins (1) and (2) with the filament filler coated with the first polycarbonate resin.

(1) a second polycarbonate resin having a weight-average molecular weight of more than 25,000 g/mol; and (2) a rubber-modified styrene graft copolymer resin and a styrene copolymer resin.

DETAILED DESCRIPTION OF THE INVENTION

Hereinafter, the present invention will be described in detail. First, the components of the resin composition according to the present invention will be described.

(A) High-Fluidity Polycarbonate Resin (First Polycarbonate Resin)

An aromatic polycarbonate resin, which is a component of the resin composition according to the invention, can be prepared by reacting diphenols represented by Chemical Formula I with phosgene, halogen formate or dicarbonate.

<Chemical Formula 1>

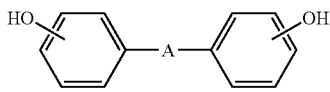

(where A represents a single bond, $C_1$ to $C_5$-alkylene, $C_1$ to $C_5$-alkylidene, $C_5$ and $C_6$-cycloalkylidene, —S—, or $SO_2$)

Examples of the diphenols represented by Chemical Formula I include, but are not limited to, 4,4'-dihydroxydiphenyl, 2,2-bis-(4-hydroxyphenyl)-propane, 2,4-bis-(4-hydroxyphenyl)-2-methyl-butane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like. Here, 2,2-bis-(4-hydroxyphenyl)-propane, 2,2-bis-(3,5-dichloro-4-hydroxyphenyl)-propane, and 1,1-bis-(4-hydroxyphenyl)-cyclohexane are preferably used, and 2,2-bis-(4-hydroxyphenyl)-propane, also known as bisphenol A, is more preferably used.

The resin composition of the present invention is prepared by forming a master-batch using a high-fluidity polycarbonate resin (first polycarbonate resin) (A) having a weight-average molecular weight of 25,000 g/mol or less and a filament filler (B), followed by blending the master-batch with a high-molecular weight polycarbonate resin (second polycarbonate resin) (C) or with a master-batch of a rubber-modified styrene graft copolymer and a styrene copolymer (C').

The adoption of the high-fluidity polycarbonate having a weight-average molecular weight of 25,000 g/mol or less facilitates a filament adding process and results in less deterioration in properties of the final resin composition. In particular, it is more preferable that the high-fluidity polycarbonate resin have a weight-average molecular weight of 10,000~25,000 g/mol in terms of impact resistance and rigidity.

(B) Filament Filler

Examples of the filament fiber used as the filler to improve the rigidity of the resin composition of the present invention include continuous filament glass fiber, continuous carbon filament fiber, continuous basalt filament fiber, continuous metal filament fiber, continuous filament boron fiber, continuous filament aramid fiber, continuous filament natural fiber, etc., and can be used individually or in combination depending on the properties of the final product.

The polycarbonate resin composition of the present invention preferably includes 1~70 parts by weight of the filament filler based on 100 parts by weight of the compositions including the high-fluidity polycarbonate resin (first carbonate resin), the filament filler, and the high-molecular weight polycarbonate resin (second polycarbonate resin) or the rubber-modified styrene graft copolymer resin and the styrene copolymer resin. The filament filler in this quantity provides good molding efficiency and excellent effects in terms of rigidity reinforcement. The content of the filament filler can be adjusted in various ratios depending on required rigidity and impact strength for a product, and more preferably in the range of 15~60 parts by weight. Also, the filament filler preferably has a length of 5~30 mm, but can be modified in various lengths according to the purpose of use. More preferably, the filament filler has a length of 10~15 mm in terms of impact resistance, rigidity, and processibility balance.

As described above, the filament filler (B) is used in preparing the resin composition of the present invention to form the master-batch to have a length of 5~30 mm along with the high-fluidity polycarbonate resin (A), and to blend the master-batch with the high-molecular polycarbonate resin (C) or with the master-batch of the rubber-modified styrene graft copolymer and the styrene copolymer (C').

(C) High-Molecular Weight Polycarbonate Resin (Second Polycarbonate)

As another component of the present invention, the high-molecular polycarbonate resin is not limited to a specific resin so long as it has a weight-average molecular weight of more than 25,000 g/mol among the aforementioned examples of the polycarbonate resin (A), but preferably includes bisphenol A formed from 2,2-bis-(4-hydroxyphenyl)-propane. This is the most widely used aromatic polycarbonate resin in industrial applications.

The polycarbonate resin having a weight-average molecular weight of more than 25,000 g/mol can eliminate processing difficulties related to high viscosity and does not deteriorate the properties of a final product. In particular, it is more preferable that the high-molecular weight polycarbonate resin have a weight-average molecular weight of 27,000~45,000 g/mol in terms of impact resistance and rigidity.

The high-molecular weight polycarbonate resin used in preparing the resin composition of the present invention may have a molecular chain and is prepared by addition of 0.05~2 mol % of a trivalent or more multifunctional compound with respect to the total amount of diphenols used for polymerization, for example, a compound having a trivalent or more phenol group.

Further, the high-molecular weight polycarbonate resin can be used as individual homo-polycarbonate or co-polycarbonate, or in a blend form of homo-polycarbonate and co-polycarbonate.

(C') Rubber-Modified Styrene Graft Copolymer Resin and Styrene Copolymer Resin (C'-1) Rubber-Modified Styrene Graft Copolymer Resin The styrene graft copolymer resin (C'-1) used in preparing the resin composition of the present invention is obtained by graft polymerization of 5~95 parts by weight of a monomer mixture (C'-1-1) and 5-95 parts by weight of a polymer (C'-1-2), in which the monomer mixture (C'-1-1) consists of 50~95 parts by weight of styrene, α-methylstyrene, halogen or alkyl-substituted styrene or a mixture thereof (C'-1-1.1) and 5-50 parts by weight of acrylonitrile, methacrylonitrile, C1-C4 alkyl- or phenyl N-substituted maleic imides or a mixture thereof, and in which the polymer (C'-1-2) is selected from the group consisting of butadiene rubber, acryl rubber, ethylene/propylene rubber, styrene/butadiene rubber, acrylonitrile/butadiene rubber, isoprene rubber, ethylene-propylene-diene terpolymer (EPDM), polyorganosiloxane/polyalkyl(meth)acrylate rubber, and mixtures thereof.

The styrene graft copolymer resin is preferably obtained from graft polymerization of a mixture of styrene and acrylonitrile monomers with butadiene rubber, acryl rubber or styrene/butadiene rubber, and may be selected from the group consisting of acrylonitrile-butadiene-styrene (ABS), acrylate-styrene-acrylonitrile (ASA), polycarbonate (PC)/ABS, and PC/ASA.

The rubber (C'-1-2) preferably has a particle diameter of 0.054 μm to improve impact strength and surface properties of a molded product.

Any method well-known to those having ordinary knowledge in the art can be used to prepare the graft copolymer resin, and may be selected from emulsion polymerization, suspension polymerization, solution polymerization or bulk polymerization. Desirably, the emulsion or bulk polymerization is used with the aforementioned aromatic vinyl monomers and a polymerization initiator in the presence of a rubber polymer.

The polycarbonate resin composition of the present invention may include 5-50 parts by weight of the rubber-modified styrene graft copolymer resin (C'-1), based on 100 parts by weight of the compositions including the high-fluidity polycarbonate resin (A), the rubber-modified styrene graft copolymer resin (C'-1), and the styrene copolymer resin (C'-2). With this content of the polycarbonate resin, the resin composition can exhibit excellent mechanical strength and fluidity.

(C'-2) Styrene Copolymer Resin

The styrene copolymer resin (C'-2-1) used in preparing the resin composition of the present invention includes a styrene copolymer or a mixture thereof, in which the styrene copolymer is obtained by copolymerization of 50~95 parts by weight of styrene, α-methyl styrene, halogen or alkyl substituted styrene or a mixture thereof (C'-2-1), and 5-50 parts by weight of acrylonitrile, methacrylonitrile, C1-C4 alkyl- or phenyl nuclear substituted maleic imides or mixtures thereof (C'-2-2).

The thermoplastic styrene copolymer resin (C'-2) may also be produced as a by-product in preparing the graft copolymer (C'-1). In particular, thermoplastic styrene copolymer resin (C'-2) is produced in great quantities when grafting a small amount of a rubber copolymer and an excessive amount of a monomer mixture or when using an excessive quantity of a chain transfer agent as a molecular weight controller. The content of the styrene copolymer resin (C'-2), used for preparing the resin composition of the present invention, does not include the byproduct of the graft copolymer (C'-1). The styrene copolymer resin is a thermoplastic resin and does not contain a rubber polymer.

A preferable styrene copolymer resin is prepared from a monomer mixture of styrene and acrylonitrile, a monomer mixture of α-methyl styrene and acrylonitrile, or a monomer mixture of styrene, α-methyl styrene, and acrylonitrile.

The styrene copolymer resin can be produced by emulsion polymerization, suspension polymerization, solution polymerization or bulk polymerization, and can be used individually or in the form of a mixture of two or more thereof.

Meanwhile, styrene monomers used in preparing the styrene copolymer resin can be replaced with α-methyl styrene, vinyl toluene, 2,4-dimethyl styrene, and substituted styrene monomers such as α-methyl styrene.

The polycarbonate resin composition of the present invention may include 5 to 60 parts by weight of the styrene copolymer (C'-2) based on 100 parts by weight of the composition including the polycarbonate resin (A), the rubber-modified styrene graft copolymer resin (C'-1), and the styrene copolymer resin (C'-2). With this content, the resin composition can exhibit excellent fluidity and mechanical strength.

Meanwhile, the ratio of high-fluidity polycarbonate resin (A) and high-molecular weight polycarbonate resin (C) is not limited to a particular value, but are preferably set to have a weight-average molecular weight of 20,000~35,000 g/mol in consideration of impact strength, flexural strength, and injection processibility balance of a final product.

Further, the resin composition of the present invention may contain additives such as talc, silica, mica, alumina, etc. The addition of such inorganic filler materials can improve properties such as mechanical strength, heat deflection temperature (HDT), and the like. In addition, the resin composition may further include ultraviolet ray absorbers, heat stabilizers, antioxidants, flame retardants, lubricants, dyes and/or pigments, etc. The use and usage of these additives are known to those having ordinary knowledge in the art.

In the method of preparing the polycarbonate resin composition reinforced with filament according to the present invention, a glass roving device employing bunches of fiber strands specially prepared is used to fill the resin with the filament fillers.

A conventional fiber filling method is a method in which 3~5 mm-long fillers and a resin mixture are added into the same inlet of an extruder or different inlets for preparation. Meanwhile, the glass roving device employing the fiber strand bunches conducts filling by successively permeating roved fillers into a melted resin material. Here, depending on the viscosity of the melted resin material, the filled fiber can be made almost infinitely long according to the roved length as necessary.

Preferably, a master-batch prepared by the glass roving device is formed into pellets with a fiber length of 5~30 mm, and preferably 1015 mm. In the range between 5~30 mm, the resin has excellent rigidity and superior reinforcing effect on impact resistance, and does not complicate production.

The master-batch is dry-blended with a high-molecular weight polycarbonate resin or a second master-batch of a rubber-modified styrene graft copolymer resin and a styrene copolymer resin, thereby producing the resin composition of the present invention that exhibits improved impact resistance and rigidity.

The resin composition according to the present invention may have a morphology in which the surface of the filament filler coated with a high-fluidity polycarbonate resin (first polycarbonate resin) is blended with a high-molecular weight polycarbonate resin (second polycarbonate resin) or a mixture of a rubber-modified styrene graft copolymer and a styrene copolymer.

In conclusion, the method of preparing the polycarbonate resin composition according to the present invention can provide improved rigidity and impact resistance to the polycarbonate resin composition by efficiently packing the filament filler in the resin, and thus it is useful to manufacture a variety of molded articles such as mobile products, electronic components, etc.

As described above, since a polycarbonate resin composition reinforced with filament provides great rigidity and impact strength, it can be useful to manufacture a variety of molded articles such as mobile products, electronic components, etc.

The present invention will hereinafter be described in detail with reference to exemplary embodiments. Here, the following exemplary embodiments are given by way of illustration only and should not be interpreted to limit the scope of the present invention. A description of contents technically apparent to those skilled in the art will be omitted herein.

First, details of components used for embodiments of the present invention will be described as follows.

(A) High-Fluidity Polycarbonate Resin (First Polycarbonate Resin)

A high-fluidity polycarbonate resin used in the embodiments of the invention is bisphenol A-type polycarbonate having a weight-average molecular weight of 20,000~22,000 g/mol.

(B) Filament Filler

A filament filler used in the embodiments of the invention is SE-2348 (Table 1) and SE-2350 (Table 2) available from Owens Corning Co., US.

(C) High-Molecular Weight Polycarbonate Resin (Second Polycarbonate Resin)

A high-molecular weight polycarbonate resin used in the embodiments of the invention is bisphenol A-type polycarbonate having a weight-average molecular weight of 33,000~35,000 g/mol.

(C'-1) Rubber-Modified Styrene Graft Copolymer

Butadiene rubber latex is added such that the butadiene content is 50 parts by weight based on the total amount of a monomer, and a mixture of 36 parts by weight of styrene, 14 parts by weight of acrylonitrile and 150 parts by weight of deionized water and additives consisting of 1 part by weight of potassium oleate, 0.4 parts by weight of cumene hydroperoxide, and 0.3 parts by weight of a mercaptan chain transfer agent are added and reacted for 5 hours at 75° C., thereby preparing ABS graft latex. A 1% sulphuric acid solution is added to the polymer latex, followed by coagulating and drying to prepare a powdery graft copolymer resin.

(C'-2) Styrene Copolymer

A mixture of 71 parts by weight of styrene, 29 parts by weight of acrylonitrile and 120 parts by weight of deionized water is mixed with additives consisting of 0.2 parts by weight of azobisisobutyronitrile, 0.3 parts by weight of a mercaptan chain transfer agent and 0.5 parts by weight of tricalcium phosphate, followed by suspension polymerization to prepare an SAN copolymer resin. The copolymer is washed, dehydrated, and dried to produce a powdery SAN copolymer resin.

Examples 1 to 3

Resin compositions were prepared with the aforementioned components according to the compositional ratio (% by weight as expressed by the content of a master-batch which is the total amount of filament and a high-fluidity polycarbonate resin) given in Table 1, which also lists the properties thereof.

Continuous filament glass fiber was added to a high-fluidity polycarbonate resin and formed into polycarbonate-resin pellets reinforced with the continuous filament glass fiber and having a final fiber length of 12 mm by means of a glass roving device which employs bunches of fiber strands. The master-batch was uniformly mixed with a high-molecular weight polycarbonate resin by dry-blending. The product was subjected to injection molding using a 10 oz injection molding device at a molding temperature of 250~280° C. and a mold temperature of 60~90° C., thereby producing samples for property evaluation. The samples were tested for notched-Izod-impact strength (⅛") according to ASTM D256 and for flexural strength according to ASTM D790. Fatigue and fracture testing was carried out by repeatedly applying a stress of 5000 psi to a tensile sample 5 times a second in the lengthwise direction of the sample to determine the stress cycle when the fatigue and fracture finally occurred.

Examples 4 to 6

Resin compositions were prepared with the aforementioned components according to the compositional ratio (% by weight as expressed by the content of a master-batch which is the total amount of filament and a high-fluidity polycarbonate resin) given in Table 2, which also lists the properties thereof.

A first master-batch including the master-batch of a high-fluidity polycarbonate resin and filament was produced into pellets having a length of 12 mm by means of a glass roving device which employs bunches of fiber strands specially prepared for filament filling. A second master-batch consisting of a rubber-modified styrene graft copolymer and a styrene copolymer was extruded by a biaxial extruder of L/D=35 and Y=45 mm at a screw rotation speed of 250 rpm, a first vent pressure of about −600 mmHg and a self-supply speed of 60 kg/h, and cut into pellets, which were then blended uniformly with the first master-batch via dry-blending. The obtained pellets were dried with hot air at 80° C. for about 3 hours and then subjected to injection molding using a 10 oz injection molding device at a molding temperature of 230-300° C. and a mold temperature of 60-90° C., thereby producing samples for property evaluation. The samples were tested for notched-Izod-impact strength (⅛") according to ASTM D256 and for flexural strength according to ASTM D790.

Comparative Examples 1 to 4

Resin compositions were prepared with the aforementioned components according to compositional ratios (% by weight) of Comparative Examples 1 to 4 given in Table 1, which also lists the properties thereof. Simple staple-filled polycarbonate resins of Comparative Examples 1 to 3 produced by adding staple of 3 mm in length and 12 μm in diameter, instead of filament, to high-fluidity and high-molecular weight polycarbonate resins with the same contents as Examples 1 to 3 were extruded by a biaxial extruder of L/D=35 and Y=45 mm at a fixing temperature of 250° C., a screw rotation speed of 200 rpm, a first vent pressure of about −600 mmHg and a self-supply speed of 60 kg/h. The extruded strand was cooled in water and cut into pellets by a rotating cutter. In Comparative Example 4, after preparing a filament filler, a high-fluidity polycarbonate resin, and a high-molecular weight polycarbonate resin in the same contents as Example 2, the high-fluidity polycarbonate resin and the high-molecular weight polycarbonate resin were mixed without a process of preparing a master-batch, and formed into pellets by means of a glass roving device which employs bunches of fiber strands.

The produced pellets were dried with hot air at 80° C. for about 3 hours and then subjected to injection molding using a 10 oz injection molding device at a molding temperature of 250~280° C. and a mold temperature of 60~90° C., thereby producing samples for property evaluation. The samples were tested for notched Izod-impact strength (⅛") according to ASTM D256 and for flexural strength according to ASTM D790. Fatigue and fracture testing was carried out by repeatedly applying a stress of 5000 psi to a tensile sample 5 times a second in the lengthwise direction of the sample to determine the stress cycle when the fatigue and fracture finally occurred.

Comparative Examples 5 to 7

Components, compositions, and properties of Comparative Examples 5 to 7 are shown in Table 2. The comparative examples were prepared by a conventional simple staple filling method. In detail, staple of 3 mm in length and 12 μm in diameter was added to a high-fluidity polycarbonate resin, a rubber-modified styrene copolymer resin and a styrene copolymer resin as employed in the examples, and was extruded by a biaxial extruder of L/D=35 and Y=45 mm at a screw rotation speed of 250 rpm, a first vent pressure of about −600 mmHg, and a self-supply speed of 60 kg/h. The extruded strand was cooled in water and cut into pellets by a rotating cutter.

The produced pellets were dried with hot air at 80° C. for about 3 hours and were subjected to injection molding using a 10 oz injection molding device at a molding temperature of 230~300° C. and a mold temperature of 60~90° C., thereby producing samples for property evaluation. The samples were tested for notched Izod-impact strength (⅛") according to ASTM D256 and for flexural strength according to ASTM D790.

TABLE 1

| | | | Example | | | Comparative Example | | | |
|---|---|---|---|---|---|---|---|---|---|
| | | | 1 | 2 | 3 | 1 | 2 | 3 | 4 |
| Composition | Fiber | Filament | 20% | 30% | 40% | — | — | — | 30% |
| | | Staple | — | — | — | 20% | 30% | 40% | — |
| | High-fluidity polycarbonate resin | | 13% | 20% | 27% | 13% | 20% | 27% | 20% |
| | Master-batch of high-fluidity polycarbonate resin and filament | | 33% | 50% | 67% | — | — | — | — |
| | High-molecular weight polycarbonate resin | | 67% | 50% | 33% | 67% | 50% | 33% | 50% |
| Property | Izod-impact strength (kgf·cm/cm) | | 12.5 | 15.6 | 20.1 | 6.8 | 8.1 | 9.9 | 7.1 |
| | Flexural strength (Kgf/cm2) | | 54,000 | 89,000 | 110,000 | 49,000 | 73000 | 98,000 | 65,000 |
| | Stress cycle in occurrence of fatigue and fracture (cycle) | | 14,500 | 18,200 | 23,400 | 11,800 | 16,400 | 20,500 | 13,200 |

TABLE 2

| | | | Example | | | Comparative Example | | |
|---|---|---|---|---|---|---|---|---|
| | | | 4 | 5 | 6 | 5 | 6 | 7 |
| Composition | Fiber | Filament | 20% | 30% | 40% | — | — | — |
| | | Staple | — | — | — | 20% | 30% | 40% |
| | Polycarbonate resin | | 43% | 39% | 30% | 43% | 39% | 30% |
| | Master-batch of polycarbonate resin and filament | | 63% | 69% | 70% | — | — | — |
| | Rubber-modified styrene copolymer | | 12% | 10% | 10% | 12% | 10% | 10% |
| | Styrene copolymer | | 25% | 21% | 20% | 25% | 21% | 20% |
| Property | Izod-impact strength (kgf·cm/cm) | | 9.5 | 12.5 | 13.5 | 5.5 | 6.9 | 7.1 |
| | Flexural strength (Kgf/cm2) | | 43,100 | 70,100 | 89,500 | 39,800 | 65,700 | 79,600 |

With regard to the compositions and properties of the resin compositions of the inventive and comparative examples with reference to Table 1, in the same content of the polycarbonate resin, the resin compositions filled with the filament (Examples 1 to 3) have much better impact strength and flexural strength than the resin compositions filled with the staple (Comparative Examples 1 to 3). Further, as the resin compositions filled with the filament have a higher content of the filling filament (Example 1→Example 3), the impact strength and flexural strength increase. Stress cycle in the occurrence of fatigue and fracture also increase as the content of the filament increases. The resin composition of Comparative Example 4, prepared with the components and the composition of Example 2 by the simple extruding method without preparing the master-batch, was inferior in permeation of the filament in a resin, exhibiting worse properties than the staple-reinforced resin composition.

Meanwhile, the resin compositions including the rubber-modified styrene copolymer and the styrene copolymer instead of the high-molecular weight polycarbonate resin provided similar results to those in Table 1.

That is, as shown in Table 2, with the same content of the polycarbonate resin, the resin compositions filled with the filament (Examples 4 to 6) have much better impact strength and flexural strength than the resin compositions filled with the staple (Comparative Examples 5 to 7). Here, as the amount of the filament in the resin composition increases (Example 4→Example 6), the impact strength and flexural strength also increase.

Conclusively, the polycarbonate resin composition prepared by the method of the invention provides high rigidity and impact strength, and thus it is useful to manufacture a variety of molded articles, such as mobile products, electronic components, etc.

While the embodiments of the present invention have been described and illustrated above with reference to the accompanying tables, it should be noted that the present invention is not limited to these embodiments but can be realized in various forms. Further, it should be understood that other modifications and substitutions can be made by those skilled in the art without departing from the spirit and scope of the present invention. Accordingly, the present invention is not to be considered as being limited by the foregoing embodiments, and is only limited by the scope of the appended claims.

The invention claimed is:

1. A polycarbonate resin composition comprising: a masterbatch comprising a filament filler having a length of 12-30 mm and a first polycarbonate resin having a weight-average molecular weight of 25,000 g/mol or less, and one of the following resins (1) or (2):
   (1) a second polycarbonate resin having a weight-average molecular weight of more than 25,000 g/mol; or
   (2) a rubber-modified styrene graft copolymer resin and a styrene copolymer resin, wherein said composition comprises said filament filler in an amount of 15 to 70 parts by weight based on 100 parts by weight of the composition including the first polycarbonate resin having a weight-average molecular weight of 25,000 g/mol or less and one of resins (1) or (2).

2. The polycarbonate resin composition according to claim 1, wherein the first polycarbonate resin has a weight-average molecular weight of 10,000~25,000 g/mol.

3. The polycarbonate resin composition according to claim 1, wherein the second polycarbonate resin has a weight-average molecular weight of 27,000~45,000 g/mol.

4. The polycarbonate resin composition according to claim 1, wherein the polycarbonate resin composition comprises 30~80% by weight of the first polycarbonate resin having a weight-average molecular weight of 25,000 g/mol or less, 5~50% by weight of the rubber-modified styrene graft copolymer resin, and 5 to 60% by weight of the styrene copolymer resin based on 100% by weight of the resin composition.

5. The polycarbonate resin composition according to claim 1, wherein the rubber-modified styrene graft copolymer resin is selected from the group consisting of acrylonitrile-butadiene-styrene (ABS), acrylate-styrene-acrylonitrile (ASA), polycarbonate (PC)/ABS, and PC/ASA.

6. The polycarbonate resin composition according to claim 1, wherein the styrene copolymer resin comprises a styrene copolymer or a mixture thereof, the styrene copolymer being obtained by copolymerizing 50~95 parts by weight of styrene, α-methyl styrene, halogen- or alkyl-substituted styrene or a mixture thereof and 5~50 parts by weight of acrylonitrile, methacrylonitrile, C1-C4 alkyl or phenyl nuclear-substituted maleic imides or a mixture thereof.

7. The polycarbonate resin composition according to claim 1, wherein the filament filler comprises continuous filament glass fiber, continuous carbon filament fiber, continuous metal filament fiber, continuous filament aramid fiber, continuous filament boron fiber, continuous basalt filament fiber, continuous filament natural fiber or a combination thereof.

8. A molded article formed of the polycarbonate resin composition according to claim 1.

9. A polycarbonate resin composition comprising a first polycarbonate resin having a weight-average molecular weight of 25,000 g/mol or less, a filament filler having a length of 12-30 mm, and one of the following resins (1) or (2):
   (1) a second polycarbonate resin having a weight-average molecular weight of more than 25,000 g/mol; or
   (2) a rubber-modified styrene graft copolymer resin and a styrene copolymer resin,
   wherein the filament filler is coated with the first polycarbonate resin and wherein the polycarbonate resin has a morphology formed by blending one of the resins (1) or (2) with the filament filler coated with the first polycarbonate resin,
   wherein said composition comprises said filament filler in an amount of 15 to 70 parts by weight based on 100 parts by weight of the composition including the first polycarbonate resin having a weight-average molecular weight of 25,000 g/mol or less and one of resins (1) or (2).

* * * * *